US011762205B1

United States Patent
Driscoll et al.

(10) Patent No.: US 11,762,205 B1
(45) Date of Patent: Sep. 19, 2023

(54) METHOD FOR CREATING UNIFORM CONTRAST ON A HEADWORN DISPLAY AGAINST HIGH DYNAMIC RANGE SCENE

(71) Applicant: Rockwell Collins, Inc., Cedar Rapids, IA (US)

(72) Inventors: Troy D. Driscoll, West Linn, OR (US); Brandon E. Wilson, Portland, OR (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 17/948,817

(22) Filed: Sep. 20, 2022

(51) Int. Cl.
G02B 27/01 (2006.01)
G06F 3/01 (2006.01)
G09G 3/00 (2006.01)
G02F 1/15 (2019.01)

(52) U.S. Cl.
CPC ..... G02B 27/0172 (2013.01); G02B 27/0179 (2013.01); G06F 3/013 (2013.01); G09G 3/002 (2013.01); G02B 2027/0118 (2013.01); G02B 2027/0138 (2013.01); G02B 2027/0187 (2013.01); G02F 1/15 (2013.01); G09G 2320/0233 (2013.01); G09G 2320/066 (2013.01); G09G 2320/0626 (2013.01); G09G 2354/00 (2013.01); G09G 2360/144 (2013.01)

(58) Field of Classification Search
USPC ........................................... 345/156
See application file for complete search history.

(56) References Cited

U.S. PATENT DOCUMENTS

| | | |
|---|---|---|
| 5,760,843 A | 6/1998 | Morimura et al. |
| 9,058,510 B1 | 6/2015 | Bold et al. |
| 9,097,891 B2 | 8/2015 | Border et al. |
| 9,134,536 B2 | 9/2015 | Sekiya et al. |
| 9,323,053 B2 | 4/2016 | Lam |
| 9,564,085 B2 | 2/2017 | Jin et al. |
| 10,181,308 B2 | 1/2019 | Irzyk |
| 10,996,514 B1 | 5/2021 | Richards |
| 11,228,723 B2 | 1/2022 | Hanwell et al. |
| 2005/0264525 A1* | 12/2005 | Adams ............... G06F 3/0304 345/156 |
| 2012/0302289 A1* | 11/2012 | Kang .................. G06F 3/016 455/557 |
| 2013/0114043 A1* | 5/2013 | Balan .................. A61B 3/113 351/210 |

(Continued)

Primary Examiner — Chineyere D Wills-Burns
(74) Attorney, Agent, or Firm — Suiter Swantz pc llo

(57) ABSTRACT

An augmented reality system is disclosed that includes an image source configured to generate an image, and a display element configured to display the image. The system further includes an optical relay configured to project the image onto the display element. The system further includes a light sensor configured to quantify an amount of ambient light passing through, the display element. The system further includes a tracker processing unit operatively coupled to the light sensor, the image source, and the optical relay. The tracker processing unit includes a processor, and a memory configured to store instructions executable by the processors. The processors are instructed to receive sensor data from the light sensor, receive the image from the image source, update a pixel characteristic for one or more pixels of the image based on the sensor data, and transmit an updated image to the optical relay.

11 Claims, 8 Drawing Sheets

(56) References Cited

U.S. PATENT DOCUMENTS

| | | | |
|---|---|---|---|
| 2013/0278631 A1* | 10/2013 | Border | G06Q 30/02 |
| | | | 345/633 |
| 2014/0111864 A1* | 4/2014 | Margulis | G02B 27/0172 |
| | | | 359/630 |
| 2016/0048220 A1* | 2/2016 | Shen | G02B 27/0172 |
| | | | 345/8 |
| 2017/0242253 A1* | 8/2017 | Benesh | G02B 27/0172 |
| 2018/0088323 A1* | 3/2018 | Bao | G02B 27/017 |
| 2018/0157066 A1* | 6/2018 | Waltermann | G02B 27/0093 |
| 2019/0230306 A1* | 7/2019 | Liu | G06F 3/0346 |
| 2021/0311311 A1 | 10/2021 | Khan | |
| 2022/0004008 A1 | 1/2022 | Choi et al. | |
| 2022/0206191 A1* | 6/2022 | Kollin | G02B 3/0006 |
| 2022/0260840 A1* | 8/2022 | Kessler | G06F 3/013 |
| 2022/0346489 A1* | 11/2022 | Stratton | A42B 3/226 |

* cited by examiner

METHOD FOR CREATING UNIFORM CONTRAST ON A HEADWORN DISPLAY AGAINST HIGH DYNAMIC RANGE SCENE

BACKGROUND

Head-worn displays (HWDs), Helmet-mounted displays, and Head-mounted displays (HMDs) permit the displaying of information, such as avionic symbology, to a user while still allowing the user to have a relatively unobstructive field of view. A problem common to these displays is the control of contrast of the displayed symbology in differing levels of ambient light. For example, when flying in the direction of the sun, the displayed symbology of an aircraft HWD may have difficulty being perceived as the outlines of the symbology may be "washed out" by the high intensity of the ambient light. A subsequent movement of the aircraft away from the sun may result in shadowing that immediately reduces ambient light, and causes the symbology of the aircraft HWD may become overtly contrasted and blurry to the pilot. These changes in perception of the symbology reduces the ability of the pilot to properly read the symbology and may cause distraction. Accordingly, a system and method to improve readability of HWD symbology in environments with constantly changing ambient light levels.

SUMMARY

An augmented reality system is disclosed. In one or more embodiments, system includes an image source configured to generate an image and a display element configured to display the image. In one or more embodiments, the system further includes an optical relay operatively coupled to the image source and the display element and configured to project the image onto the display element. In one or more embodiments, the system further includes a light sensor configured to quantify an amount of ambient light passing through, or adjacent to, the display element. In one or more embodiments, the system further includes a tracker processing unit operatively coupled to the light sensor, the image source, and the optical relay. In one or more embodiments, the tracker includes one or more processors, and a memory configured to store instructions executable by the one or more processors, wherein the instructions, upon execution by the one or more processors, cause the one or more processors to receive sensor data from the light sensor and receive the image from the image source. In one or more embodiments, the instructions further cause the one or more processors to update a pixel characteristic for one or more pixels of the image based on the sensor data, creating an updated image and transmit the updated image to the optical relay.

In some embodiments of the system, the system further includes a tracking system operatively coupled to the tracking processing unit and configured to track at least one eye, wherein the tracker processing unit is configured to determine the light intensity of ambient light received by the at least one eye through the display element.

In some embodiments of the system, the light sensor is configured as a camera.

In some embodiments of the system, the system further includes an adjustable visor operatively coupled to the sensor and configured to partially block ambient light, wherein the adjustable visor is adjusted based on the amount of ambient light passing through the display element.

In some embodiments of the system, the adjustable visor is configured as an electrochromic visor.

In some embodiments of the system, the system is embodied in a head-worn display system.

In some embodiments of the system, the instructions further cause the one or more processors to determine if the at least one eye views a control panel element through the display element, and lower the pixel intensity for one or more pixels of the image in line with the control panel element.

Another system is disclosed. In one or more embodiments, system includes an image source configured to generate an image and a display element configured to display the image. In one or more embodiments, the system further includes an optical relay operatively coupled to the display element and configured to project the image onto the display element. In one or more embodiments, the system further includes a light sensor configured to quantify an amount of ambient light passing through the display element. In one or more embodiments, the system further includes a tracker processing unit operatively coupled to the light sensor, and the image source. In one or more embodiments, the tracker includes one or more processors, and a memory configured to store instructions executable by the one or more processors, wherein the instructions, upon execution by the one or more processors, cause the one or more processors to receive sensor data from the light sensor and create a brightness matrix for portions of the display element based on the sensor data. In one or more embodiments, the instructions further cause the one or more processors to transmit the brightness matrix to the image source, wherein the image source is configured to adjust a characteristic of the image based on the brightness matrix.

In some embodiments of the system, the system further includes a tracking system operatively coupled to the tracking processing unit and configured to track at least one eye, wherein the tracker processing unit is configured to determine the light intensity of ambient light received by the at least one eye through the display element.

In some embodiments of the system, the light sensor is configured as a camera.

In some embodiments of the system, the system further includes an adjustable visor operatively coupled to the sensor and configured to partially block ambient light, wherein the adjustable visor is adjusted based on the amount of ambient light passing through the display element.

In some embodiments of the system, the adjustable visor is configured as an electrochromic visor.

In some embodiments of the system, the system is embodiments in a head-worn display system.

In some embodiments of the system, the instructions further cause the one or more processors to determine if the at least one eye views a control panel element through the display element and modify the brightness matrix for portions of the display element in line with the control panel element.

In some embodiments of the system, the system is embodied in a head-up display system.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Figure 1:
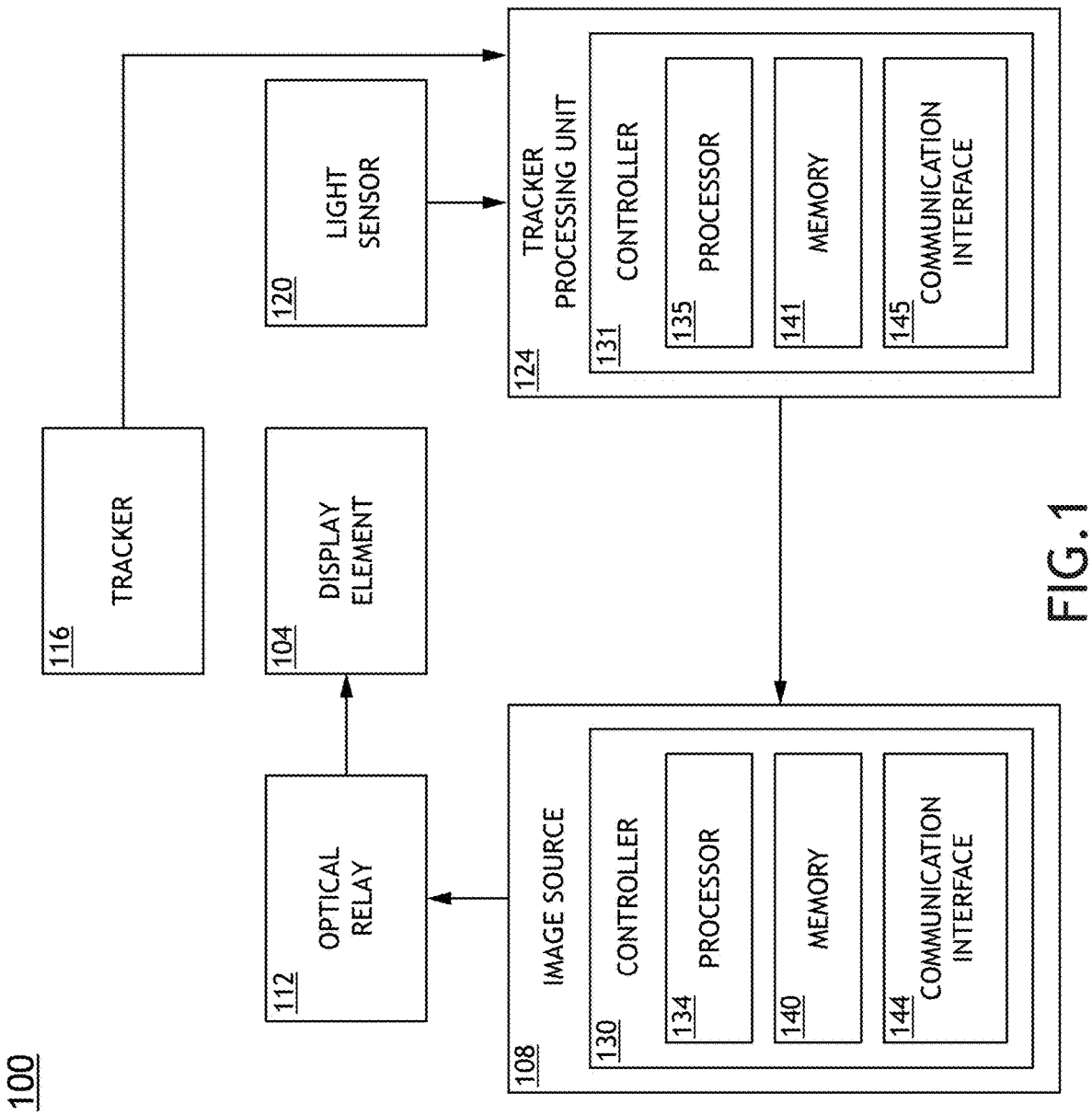
FIG. 1 is a block diagram of an augmented reality system, in accordance with one or more embodiments of the disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

A system and method for increasing the readability of symbology on an augmented reality system, such as an augmented reality system for a head worn display (HWD) is disclosed. The system includes both an image source that generates the symbology shown on the augmented reality display as well as a tracker processing unit that receives inputs from a head/eye tracker and a light sensor/camera. The tracker processing unit determines the intensity of the ambient light viewed through the augmented reality display and either modifies the symbology intensity or instructs the image source to modify the symbology intensity based on the tracker and sensor inputs. The modified symbology intensity is made easier to read and comprehend even as ambient light levels charge considerably.

FIG. 1 is a block diagram of an augmented reality system 100, in accordance with one or more embodiments of the disclosure. The augmented reality system 100 includes a semitransparent display element 104 that allows a user to detect symbology or other imagery presented on the display element 104 while still allowing the user to see a real-world view through the display element 104. The augmented reality system 100 may include any type of display element 104 used in augmented reality technologies including but not limited to head-worn displays (HWD), head-mounted displays (HMD), helmet mounted displays, head-up displays (HUD), head-down displays (HDD), and the like.

In embodiments, the augmented reality system 100 includes an image source 108 configured to send images (e.g., symbols, symbology o any other type of image to be displayed on a display element 104) to the display element 104 via an optical relay 112. The image source 108 may be any type of image generating and/or processing device including but not limited to a computer. For example, the image source 108 may be configured as an aircraft computer that sends aviation-related symbology (e.g., navigation data, aircraft systems data, weapons data) to the display element 104. The optical relay 112 may be configured as any medium that receives imagery/symbology from the image source 108 and displays and/or projects the imagery/symbology onto the display element 104, including but not limited to a waveguide, one or more mirrors, or one or more lenses.

In embodiments, the augmented reality system 100 further includes a tracker 116 configured to track the position of the user in order to determine the position of at least one eye. By tracking the position of at least one eye, the augmented reality system 100 can then determine what the field of view of the eye relative to the display element 104. For example, the tracker 116 may determine that the eye is looking out of a brightly-lit aircraft window. In another example, the tracker 116 may determine that the eye is looking downward toward a less-brightly lit control panel. The tracker 116 may include any type of tracking technology including but not limited to the use of reference marks or fiducials located on the user (e.g., the helmet) and/or within the cockpit. The tracker 116 may track the eye and/or pupil directly or may track other aspects of the user, such as the head or helmet, and estimate the eye position based on the position of the head or helmet. The tracker 116 then sends out tracking information related to the position of at least one eye of the user to other components of the augmented reality system 100 for further processing.

In embodiments, the augmented reality system 100 further includes a light sensor 120 configured to detect ambient light. For example, the light sensor 120 may be configured to detect and/or determine light passing through, or adjacent to, the display element 104 (e.g., within the field of view of one or both eyes of the user. In another example, the, light sensor 120 may be configured to detect and/or determine light that within the general field of view of the user (e.g., not necessarily passing through the display element), wherein the light viewed by the user through the display element 104 can be determined via processing elements within the augmented reality system.

The light sensor 120 may be configured as any type of visible light-detecting device including but not limited to a photodiode, a photoresistor, a phototransistor, a photovoltaic light sensor, or a camera. For example, the light sensor 120 may be configured as a digital camera, such as a charged-coupled device (CCD) camera or a complementary metal-oxide-semiconductor (CMOS) camera that is physically coupled to the helmet and/or glasses of the augmented reality system and records images of the field of view of one or both eyes (e.g., the light sensor 120 recording a representation what the user is seeing with particular emphasis on the intensity of the light).

In embodiments, the augmented reality system 100 further includes a tracker processing unit 124 operatively coupled to the image source 108, the tracker 116, and the light sensor 120. The tracker processing unit 124 receives data from the tracker 116 and the light sensor 120, and determines the brightness of the ambient light that the passing through the display element 104 or portions (e.g., portions represented by one or more pixels) of the display unit. For example, the tracker processing unit 124 may be configured to generate a brightness matrix that determines the amount of ambient light that passes through each portion/pixel of the display element. The tracker processing unit 124 may then send data from the brightness matrix to the image source 108, where the image source 108 than adjusts the intensity of the image/symbology based on the data before sending the image/symbology to the optical relay 112. For example, if the tracker processing unit 124 determines that a view of the eye or eyes includes both a bright window and a less-lit control panel, the image source 108 will modify the image/symbology based on data from the tracker processing unit 124 to increase the intensity of the image/symbology in the field of view that includes the bright window, and reduce the intensity of the image/symbology in the field of view that includes the less-lit control panel. Both the image source 108 and tracker processing units 124 include respective controllers 130, 131 that operate to provide the processing functionality needed by the augmented reality system 100. The controllers 130, 131 include respective one or more processors 134, 135, memory 140, 141, and communication interfaces 144, 145.

The one or more processors 134, 135 may include any processor or processing element known in the art. For the purposes of the present disclosure, the term "processor" or "processing element" may be broadly defined to encompass any device having one or more processing or logic elements (e.g., one or more micro-processor devices, one or more application specific integrated circuit (ASIC) devices, one or more field programmable gate arrays (FPGAs), one or more digital signal processors (DSPs), or a state device). In this sense, the one or more processors 134, 135 may include any device configured to execute algorithms and/or instructions (e.g., program instructions stored in memory 140, 141).

The memory 140, 141 may include any storage medium known in the art suitable for storing the one or more sets of program instructions executable by the associated one or more processors 134, 135. For example, the memory 140, 141 may include a non-transitory memory medium. For instance, the memory 140, 141 may include, but is not limited to, a read-only memory (ROM), a random-access memory (RAM), a magnetic or optical memory device (e.g., disk), a magnetic tape, a solid-state drive, and the like. The memory 140, 141 may be configured to provide information to the controller 130, 131, or other components of the augmented reality system 100. In addition, the memory 140, 141 may be configured to store user input. The memory 140, 141 may be housed in a common controller housing with the one or more processors 134, 135. The memory 140, 141 may, alternatively or in addition, be located remotely with respect to the spatial location of the processors 134, 135, or the controller 130, 131. For example, the one or more processors 134, 135 and/or the controller 130, 131 may access a remote memory 140, 141 accessible through a network (e.g., wireless, and the like) via one or more communication interfaces 144, 145.

The one or more communication interfaces 144, 145 may be operatively configured to communicate with components of the controller 130, 131 or any other componentry within the augmented reality system 100. For example, the one or more communication interfaces 144, 145 may be configured to retrieve data from the one or more processors 134, 135 or other devices, transmit data for storage in the memory 140, 141, retrieve data from storage in the memory 140, 141, and so forth. The one or more communication interfaces 144, 145 may also be communicatively coupled with the one or more processors 134, 135 to facilitate data transfer between components of the controller 130, 131, and other component of the augmented reality system 100. It should be noted that while the one or more communication interfaces 144, 145 are described as a component of the controller 130, 131, one or more components of the one or more communication interfaces 144, 145 may be implemented as external components communicatively coupled to the controller 130, 131 via a wired and/or wireless connection. It should also be noted that other components of the augmented reality system 100 (e.g., tracker 116 and/or light sensor) may also have respective controllers 130, 131 with respective one or more processors 134, 135, memory 140, 141, and communication interfaces 144, 145.

Figure 2:
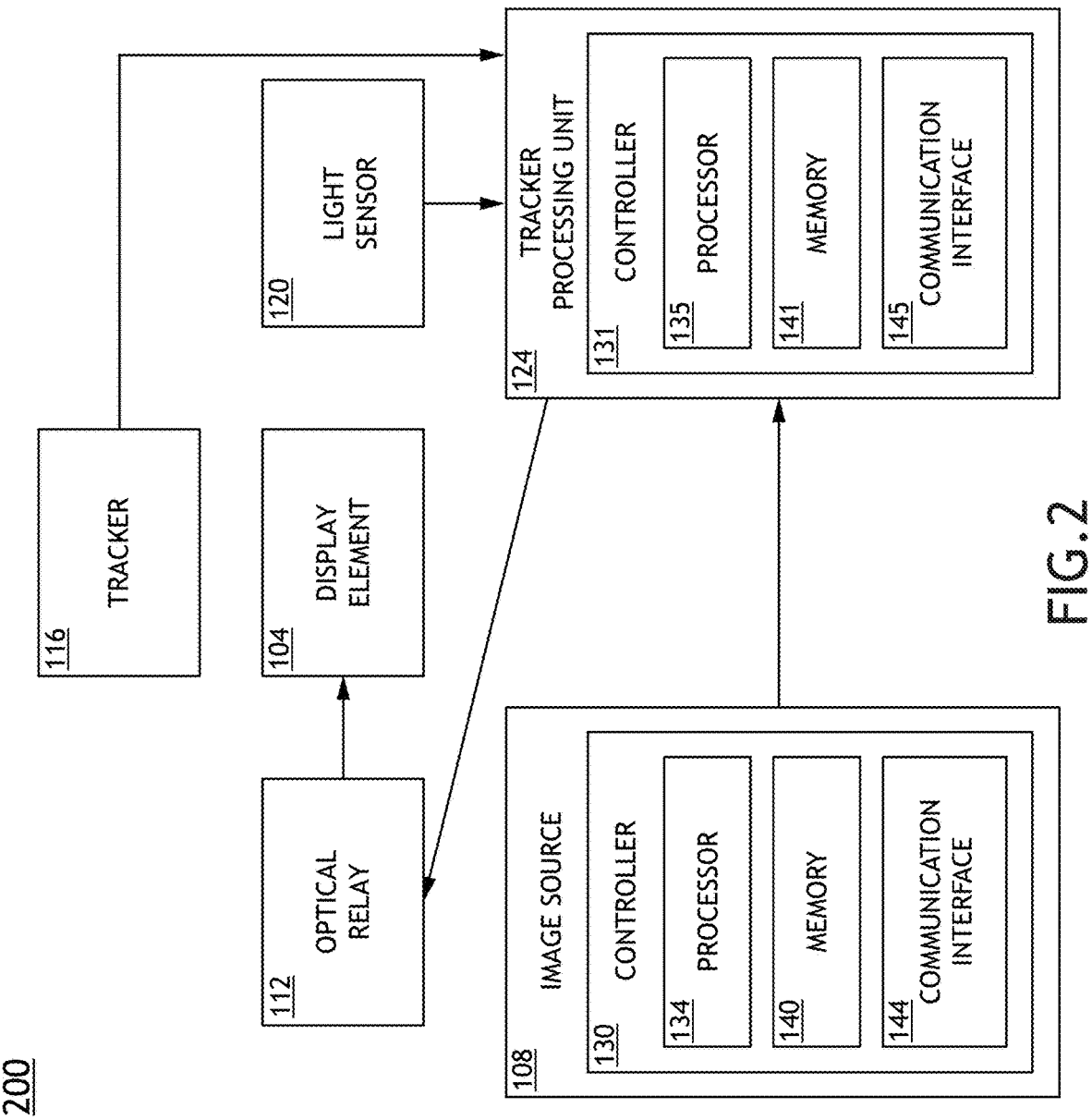
FIG. 2 is a block diagram illustrating an augmented reality system, in accordance with one or more embodiments of the disclosure.

FIG. 2 is a block diagram illustrating an augmented reality system 200, in accordance with one or more embodiments of the disclosure. The augmented reality system 200 may include one or more, or all components of the augmented reality system 100, and vice versa. In the augmented reality system 200, the image source 108 initially sends image/symbology data to the tracker processing unit 124. The tracker processing unit 124 then updates the pixel intensity for the pixels of the of each image/symbol based on the inputs from the tracker 116 and the light sensor 120. Once updated, the tracker processing unit sends the resultant updated image/symbology to the optical relay 112.

The updated image/symbology include any change that favorably affects the ability of the user to effectively see the image/symbology. Besides the changes in image/symbology intensity as described herein, the image/symbology may also be modified via changes in color, changed in line thickness, changes in local contrast, and the like. Therefore, the above description should not be interpreted as a limitation of the present disclosure, but merely as an illustration.

Figure 3A:
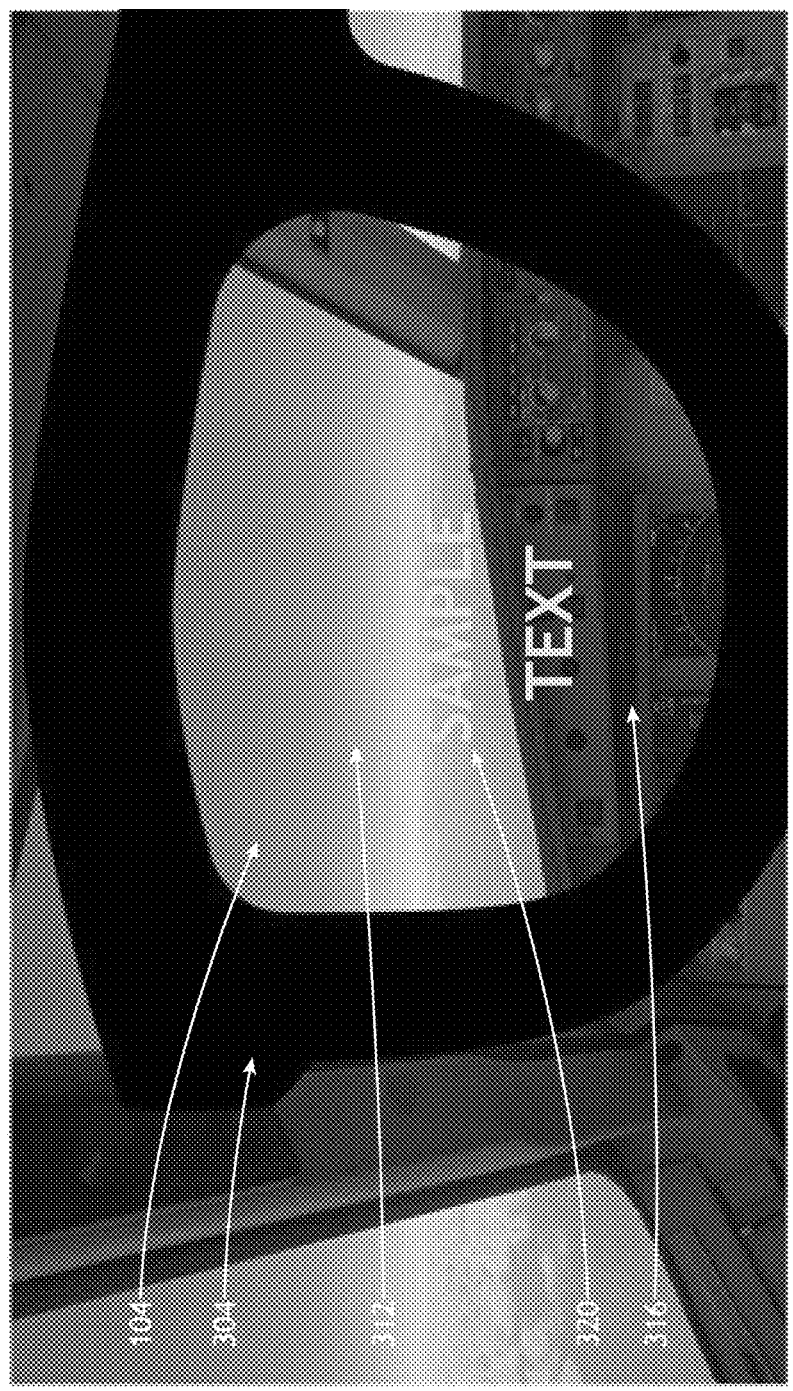
FIG. 3A-B are drawings of a field of view of a cockpit as seen from an eye of a pilot looking through the display element, in accordance with one or more embodiments of the disclosure.
Figure 3B:
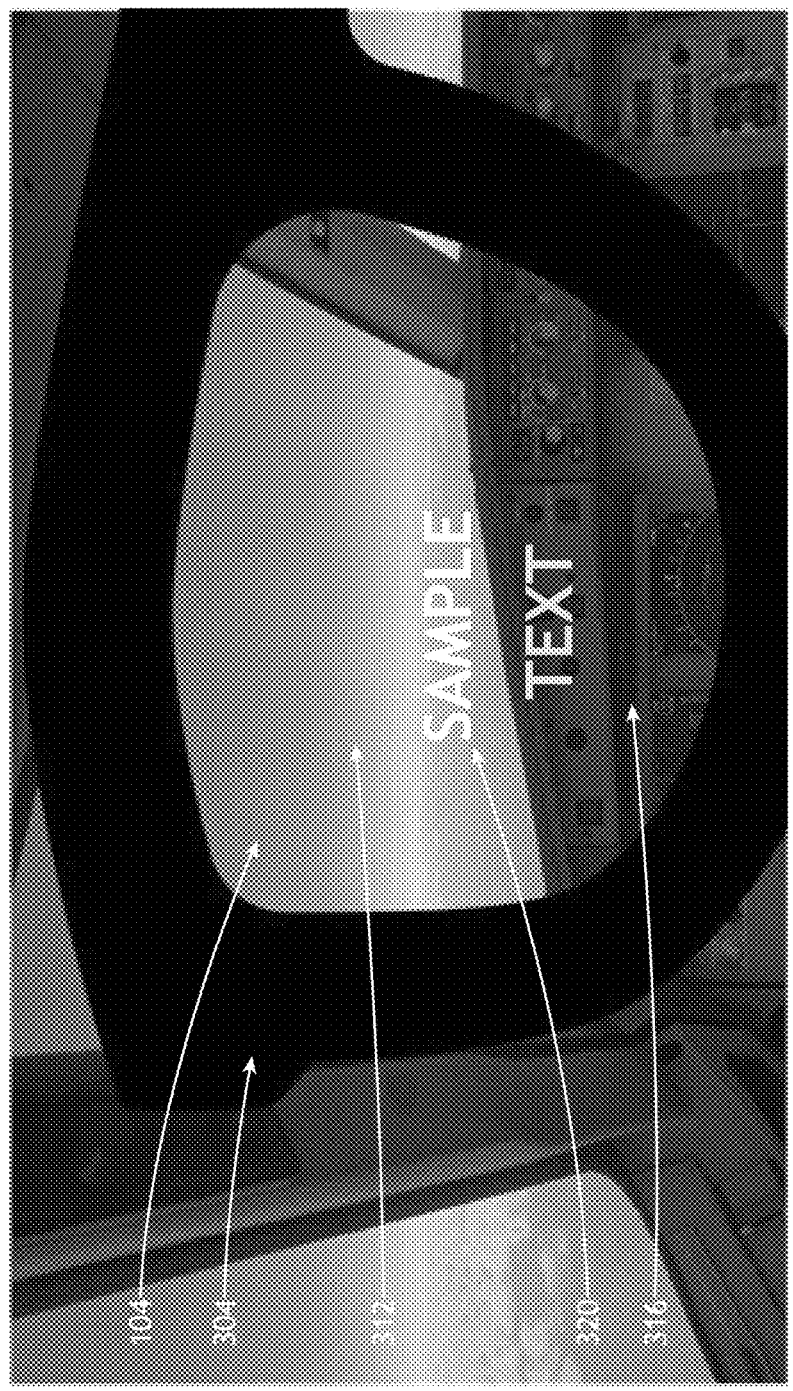

FIG. 3A-B are drawings of a field of view of a cockpit 300 as seen from an eye of a pilot looking through the display element 104 (e.g., an eyepiece 304 of a pair of augmented reality spectacles, in accordance with one or more embodiments of the disclosure). Seen within the view of the eyepiece 304 is the bright sky from an aircraft window 312 and a relatively dark control panel 316 (e.g., instrument panel). Also appearing on the display element 104 is the phrase 320 "SAMPLE TEXT", with the word "SAMPLE" appearing at a place where the background is bright, and the word "TEXT" appearing at a place where the background is dark. Both words of phrase 320 in FIG. 3A are of equal color and intensity. However, the word "sample" is more difficult to see due to the brightness of the background.

In FIG. 3B, portions of the symbology are shown as modified via the tracker processing unit 124. For example, one or more portions of the symbology may be adjusted such that the contrast of such portions is adjusted (e.g., increased, balanced with the contrast of other portions relative to the background, and the like). In FIG. 3B, the word "SAMPLE" has been adjusted to increase contrast relative to the aircraft window 312, and the word "TEXT" has been adjusted to vary the contrast relative to the darker control panel 316. In this regard, the word "SAMPLE" may have a contrast to its respective background that is similar to the contrast of the word "TEXT" relative to its respective background. The changes of the symbology within the augmented reality system 100 are dynamic such that raising the eyepiece to 304 to view more of the aircraft window 312 may result in both words of the phrase 320 being made to have an adjusted (e.g., increased) contrast, and lowering the eyepiece to view more of the control panel 316 may result in both words of the phrase 320 being adjusted in a different manner (e.g., lower in brightness). As described above, the changes in the phrase 320 may include changed in intensity, color, line thickness, and/or the like.

Figure 4:
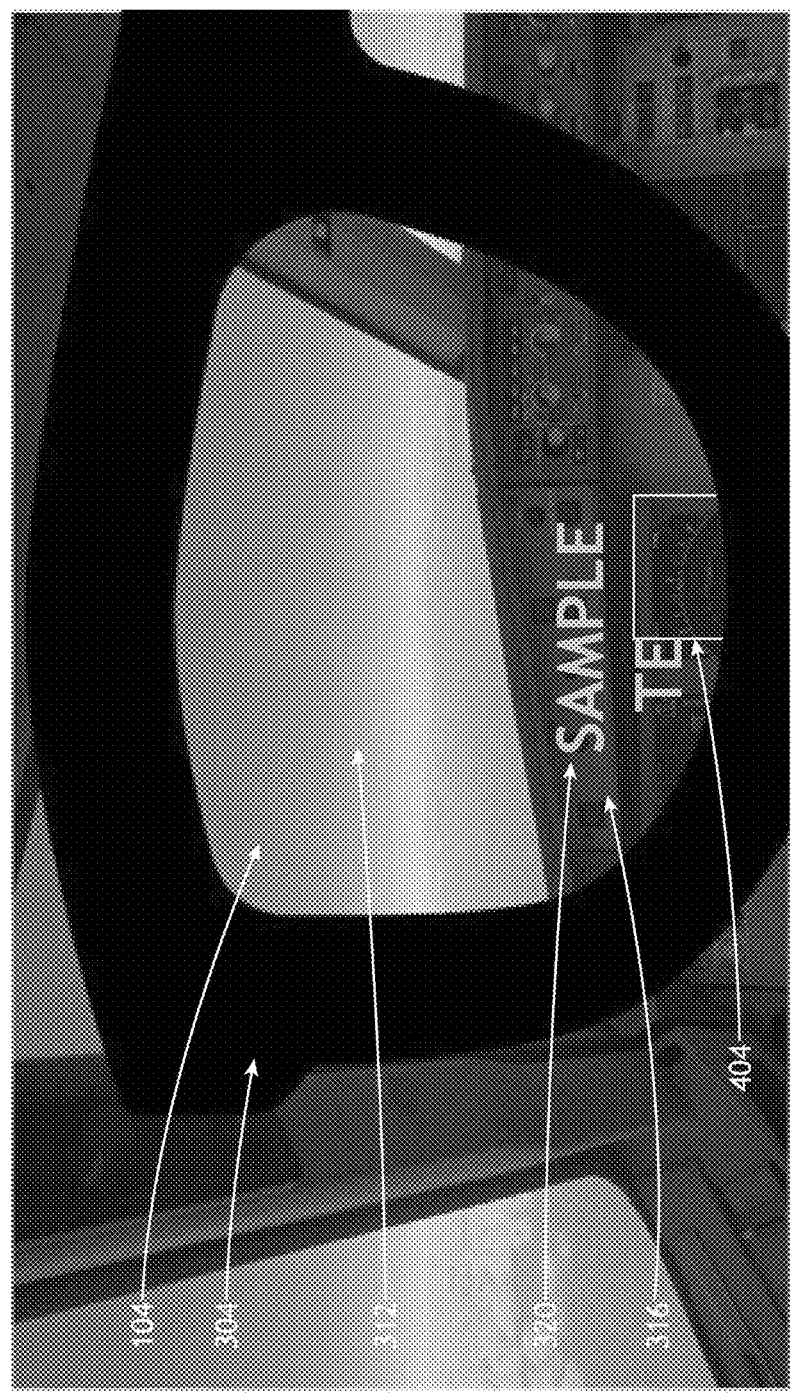
FIG. 4 is a drawing of a field of view of a cockpit as seen from an eye of a pilot looking through the display element in accordance with one or more embodiments of the disclosure.

In some embodiments, the augmented reality system 100 is configured to prevent images/symbology from blocking the view of critical instrumentation, as shown in FIG. 4, in accordance with one or more embodiments of the disclosure. For example, the augmented reality system 100 may be configured to prevent the primary flight display 404 from being obscured by the phrase 320 "SAMPLE TEXT". For example, and as shown in FIG. 4, the tracker processing unit 124 may determine that the phrase 320 will partially obscure the primary flight display 404, and subsequently modify, or direct the image source 108 to modify, the phrase (e.g., removing the letters "X" and "T"). In this manner, any instrumentation may be prevented from being obscured from the image/symbology including but not limited to fuel gauges, navigation displays, altimeters, warning lights, and the like.

Figure 5:
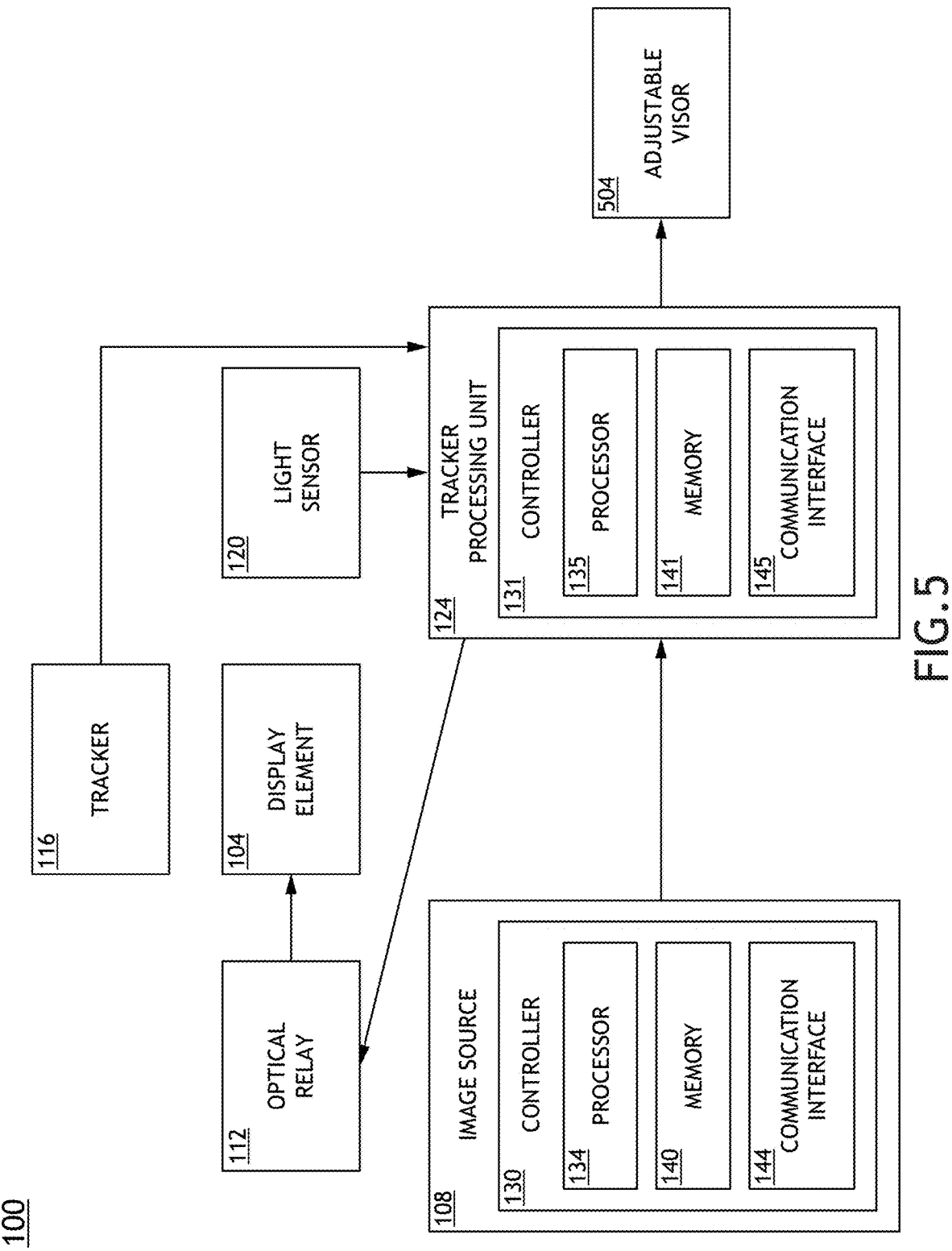
FIG. 5 is a block diagram illustrating an augmented reality system operatively coupled to an adjustable visor, in accordance with one or more embodiments of the disclosure.

FIG. 5 is a block diagram illustrating an augmented reality system 500 operatively coupled to an adjustable visor 504, in accordance with one or more embodiments of the disclosure. The augmented reality system 500 may include one or more, or all components of the augmented reality system 100, 200, and vice versa. The augmented reality system 100 may either physically integrate and connect with the adjustable visor 504 or merely be configured to connect and communicate with the adjustable visor 504. The adjustable visor 504 may be integrated with the display element 104, or may be located elsewhere in the environment. For example, the adjustable visor 504 may be integrated into the aircraft window 312

The adjustable visor 504 may operate based on any type of shading technology. For example, the adjustable visor 504 may be configured as an electrochromic visor, wherein an electrical signal changes the ability of the adjustable visor 504 to block sunlight from passing through the display element 104. For instance, upon the tracking processing unit 124 determining that the ambient light in the cockpit is higher than a predetermined level, the tracking processing unit 124 may send a signal to the adjustable visor 504 commanding the adjustable visor 504 to reduce the transmission of light through the adjustable visor 504. In another example, the adjustable visor 504 may be configured as a mechanical visor (e.g., a shade), with the tracking processing unit 124 controlling the ability of the opening and closing of the shade based on the determined amount of ambient light.

Figure 6:
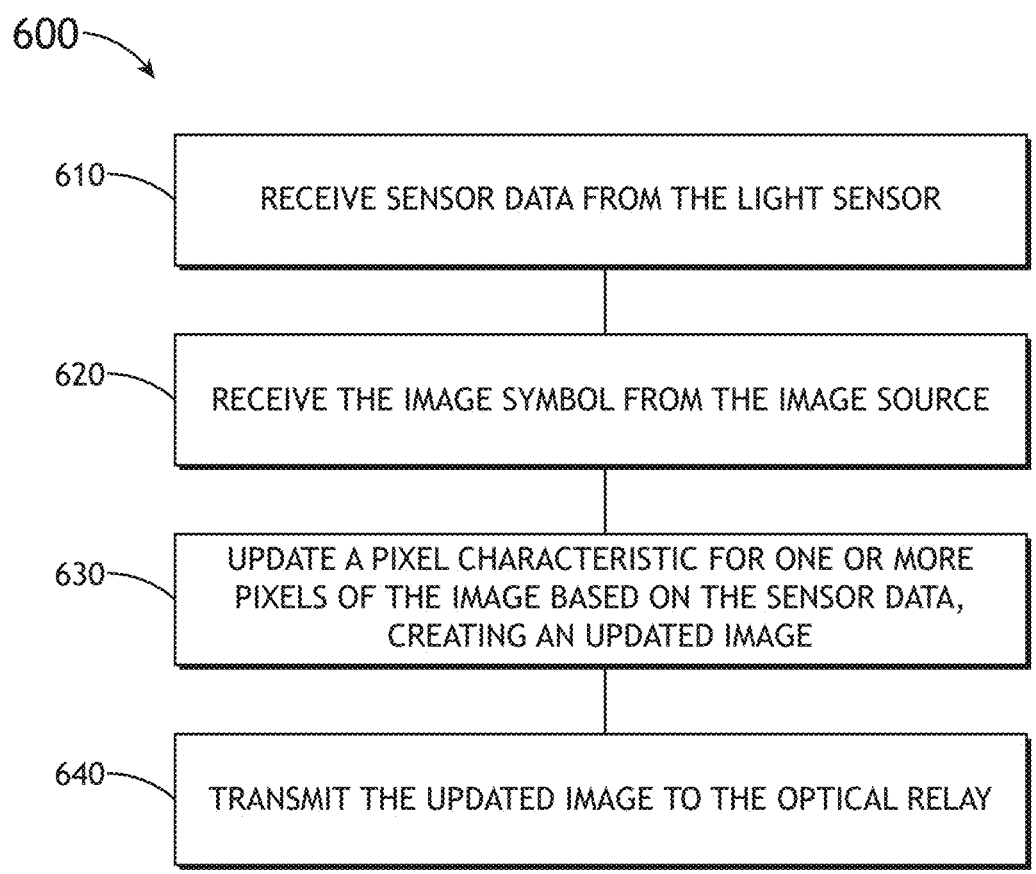
FIG. 6 is a flow diagram illustrating a method for a modifying the image/symbology displayed on a display element, in accordance with one or more embodiments of the disclosure.

FIG. 6 is a flow diagram illustrating a method 600 for a modifying the image/symbology displayed on a display element 104, in accordance with one or more embodiments of the disclosure. The method 600 may be utilized by any type of display element of an augmented reality system (e.g., HWD, HUD, or HDD), and the image/symbology may be modified in any manner (e.g., intensity, color, contrast, or line thickness).

In embodiments, the method 600 includes a step 610 of receiving sensor data from the light sensor 120. For example, the tracker processing unit 124 may receive sensor data from the light sensor 120 that quantifies the current amount of ambient light that it is receiving. In another example, the light sensor 120 is configured as a digital camera that can record the amount of ambient light for a pixel, or a set of pixels, that is received by the camera per unit time.

In embodiments, the method 600 includes a step 620 of receiving the image/symbology from the image source. For example, the image source 108 may generate the image/symbology and send the image/symbology to the tracker processing unit 124.

In embodiments, the method 600 includes a step 630 of updating a pixel characteristic for one or more pixels of the image based on the sensor data, creating an updated image. For example, if the sensor data indicates high ambient light in the cockpit, the tracker processing unit may update the image so that the update image will present image/symbology of higher contrast that is easier to discern. The updated image is then transmitted to the optical relay 112, as included in a step 640. The method 600 may also include a step of transmitting tracking data from the tracker 116 to the tracker processing unit 124, which, along with the sensor data, is utilized for updating the image/symbology.

Figure 7:
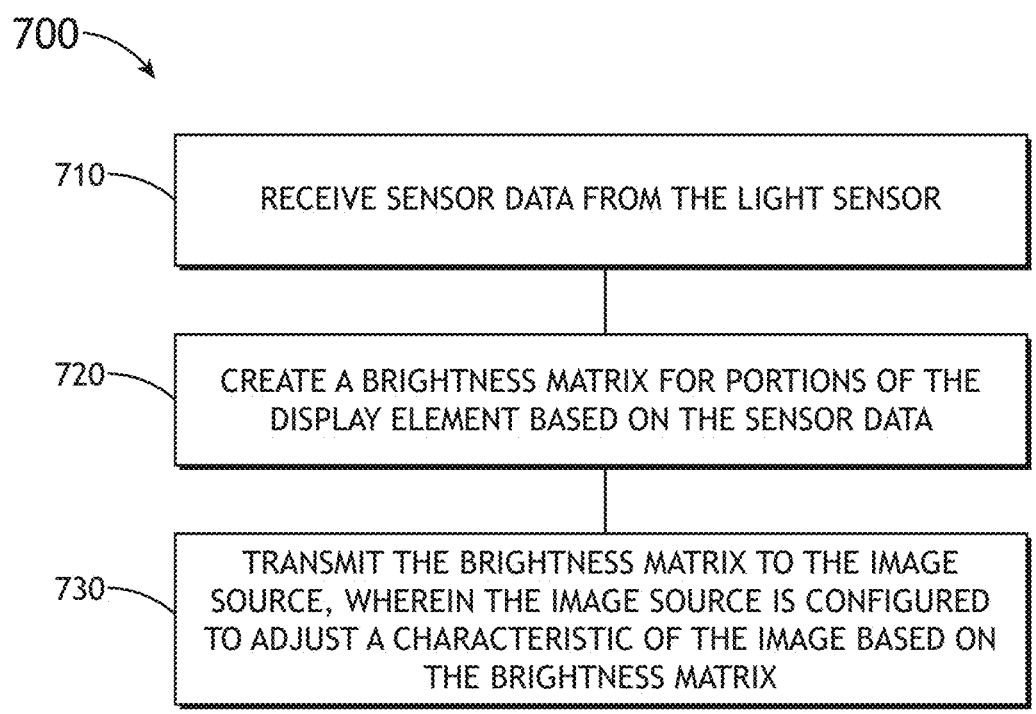
FIG. 7 is a flow diagram illustrating a method for a modifying the image/symbology displayed on a display element, in accordance with one or more embodiments of the disclosure.

FIG. 7 is a flow diagram illustrating a method 600 for a modifying the image/symbology displayed on a display element 104, in accordance with one or more embodiments of the disclosure. This method 700 includes a step 710 of receiving sensor data from the light sensor, similar to step 610 of the method 600. However, the method 700 includes a step 720 of creating a brightness matrix for portions of the display element based on the sensor data. The method 700 further includes a step 730 of transmitting the brightness matrix to the image source, wherein the image source is configured to adjust a characteristic of the image based on the brightness matrix. The adjusted, or updated image is then transmitted to the optical relay 112.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed is:

1. An augmented reality system comprising:
   an image source configured to generate an image;
   a display element configured to display the image;
   an optical relay operatively coupled to the display element and configured to project the image onto the display element;
   a light sensor configured to quantify an amount of ambient light adjacent to, or passing through, the display element; and
   a tracker processing unit operatively coupled to the light sensor, the image source, and the optical relay, comprising:
      one or more processors; and
      a memory configured to store instructions executable by the one or more processors, wherein the instructions, upon execution by the one or more processors, cause the one or more processors to:
         receive sensor data from the light sensor;
         receive the image from the image source;
         update a pixel characteristic for one or more pixels of the image based on the sensor data, creating an updated image; and
         transmit the updated image to the optical relay,
         determine that the at least one eye views a control panel element through the display element; and
         lower the pixel intensity for one or more pixels of the image in line with the control panel element to prevent symbology from blocking a view of the control panel element; and
   a tracking system operatively coupled to the tracking processing unit and configured to track at least one eye, wherein the tracker processing unit is configured to determine the light intensity of ambient light received by the at least one eye through the display element.

2. The augmented reality system of claim 1, wherein the light sensor is configured as a camera.

3. The augmented reality system of claim 1, further comprising an adjustable visor operatively coupled to the sensor and configured to partially block the ambient light, wherein the adjustable visor is adjusted based on the amount of ambient light passing through the display element.

4. The augmented reality system of claim 3, wherein the adjustable visor is configured as an electrochromic visor.

5. The augmented reality system of claim 1, wherein the augmented reality is embodied in a head-worn display system.

6. An augmented reality system comprising:
   an image source configured to generate an image;
   a display element configured to display the image;
   an optical relay operatively coupled to the image source and the display element, configured to project the image onto the display element;
   a light sensor configured to quantify an amount of ambient light adjacent to, or passing through, the display element; and
   a tracker processing unit operatively coupled to the light sensor, and the image source, comprising:
      one or more processors; and
      a memory configured to store instructions executable by the one or more processors, wherein the instructions, upon execution by the one or more processors, cause the one or more processors to:
         receive sensor data from the light sensor;
         create a brightness matrix for portions of the display element based on the sensor data;
         transmit the brightness matrix to the image source, wherein the image source is configured to adjust a characteristic of the image based on the brightness matrix,
         determine that the at least one eye views a control panel element through the display element; and
         modify the brightness matrix for portions of the display element in line with the control panel element to prevent symbology from blocking a view of the control panel element; and
   a tracking system operatively coupled to the tracking processing unit and configured to track at least one eye, wherein the tracker processing unit is configured to determine the light intensity of ambient light received by the at least one eye through the display element.

7. The augmented reality system of claim 6, wherein the light sensor is configured as a camera.

8. The augmented reality system of claim 6, further comprising an adjustable visor operatively coupled to the sensor and configured to partially block the ambient light, wherein the adjustable visor is adjusted based on the amount of ambient light passing through the display element.

9. The augmented reality system of claim 8, wherein the adjustable visor is configured as an electrochromic visor.

10. The augmented reality system of claim 6, wherein the augmented reality system is embodied in a head-worn display system.

11. The augmented reality system of claim 6, wherein the augmented reality system is embodied in a head-up display system.

* * * * *